W. C. STEVENS.
MOTOR TIRE HARD BASE APPLYING MACHINE.
APPLICATION FILED AUG. 8, 1917.

1,270,895.

Patented July 2, 1918.
4 SHEETS—SHEET 1.

Witnesses:

Inventor
William C. Stevens.
By Wilkinson & Huxley
Attys

W. C. STEVENS.
MOTOR TIRE HARD BASE APPLYING MACHINE.
APPLICATION FILED AUG. 8, 1917.

1,270,895.

Patented July 2, 1918.
4 SHEETS—SHEET 3.

Witnesses:

Inventor
William C. Stevens.
By Wilkinson & Hurley
Attys

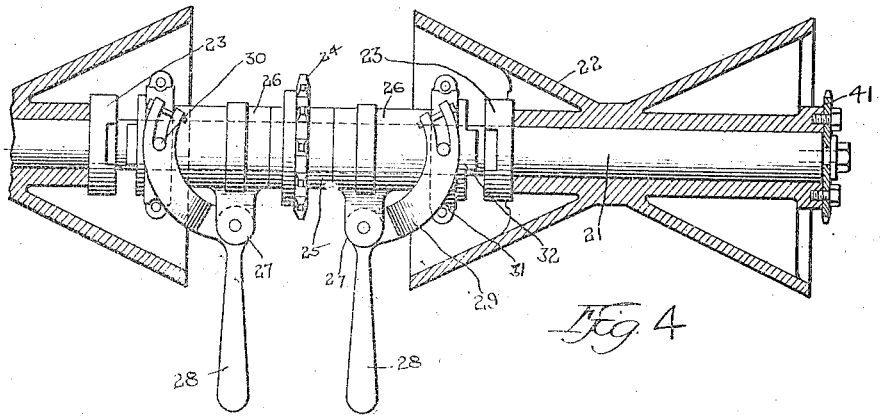
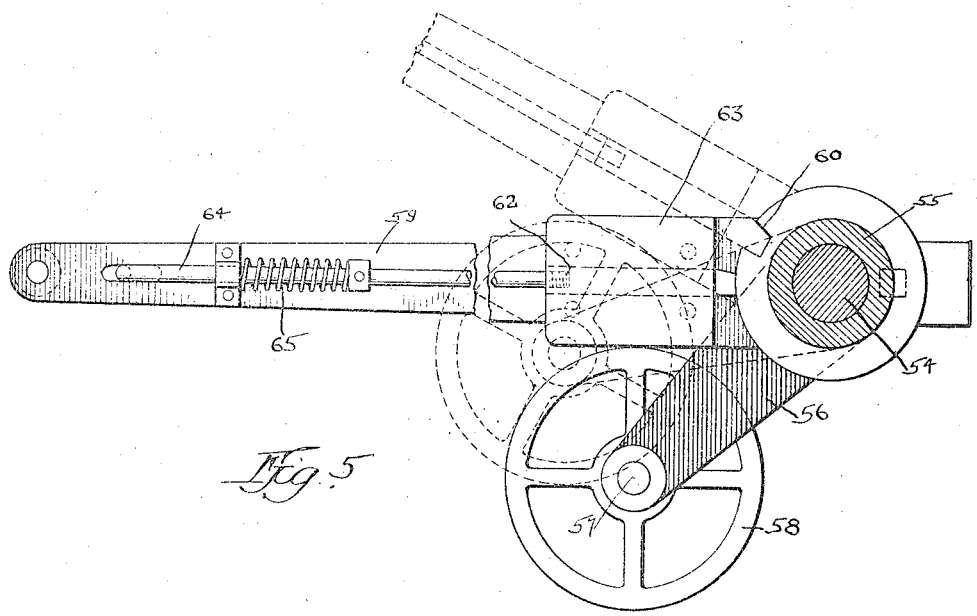

UNITED STATES PATENT OFFICE.

WILLIAM C. STEVENS, OF SUMMIT COUNTY, OHIO, ASSIGNOR TO THE FIRESTONE TIRE & RUBBER COMPANY, OF AKRON, OHIO, A CORPORATION OF OHIO.

MOTOR-TIRE-HARD-BASE-APPLYING MACHINE.

1,270,895.  Specification of Letters Patent.  Patented July 2, 1918.

Application filed August 6, 1917. Serial No. 185,169.

*To all whom it may concern:*

Be it known that I, WILLIAM C. STEVENS, a citizen of the United States, and a resident of Summit county, State of Ohio, have invented certain new and useful Improvements in Motor-Tire-Hard-Base-Applying Machines, of which the following is a specification.

In a prior application Serial No. 146,695, filed February 5, 1917, there is described a new method of manufacturing what are known as hard base cushion tires, by which is meant, motor tires comprising a cushion portion of rubber which is secured to a metal rim by an intermediate layer of hard rubber. This method comprises the steps among others of forming the hard base tire by extrusion through a suitable die, the hard base being then cut to proper length to surround the rim. The rim is prepared for the reception of the hard base by being coated with a suitable rubber cement and then warmed slightly until both the rim and cement are heated to a proper temperature to receive the hard base.

The purpose of this invention is to form and construct a machine which will readily cover the rim with the base of hard rubber compound. The machine herein disclosed will quickly envelop the rim with the hard base, will be easy to manipulate and rapid and economic in its operation. These and other purposes will appear as the description proceeds.

In the drawings I have shown one embodiment of my invention in which:

Fig. 4 is a cross section of a detail showing the method of operating the rim supporting and driving rollers.

Fig. 5 is a detail elevation of the stitcher mechanism.

Figure 1:
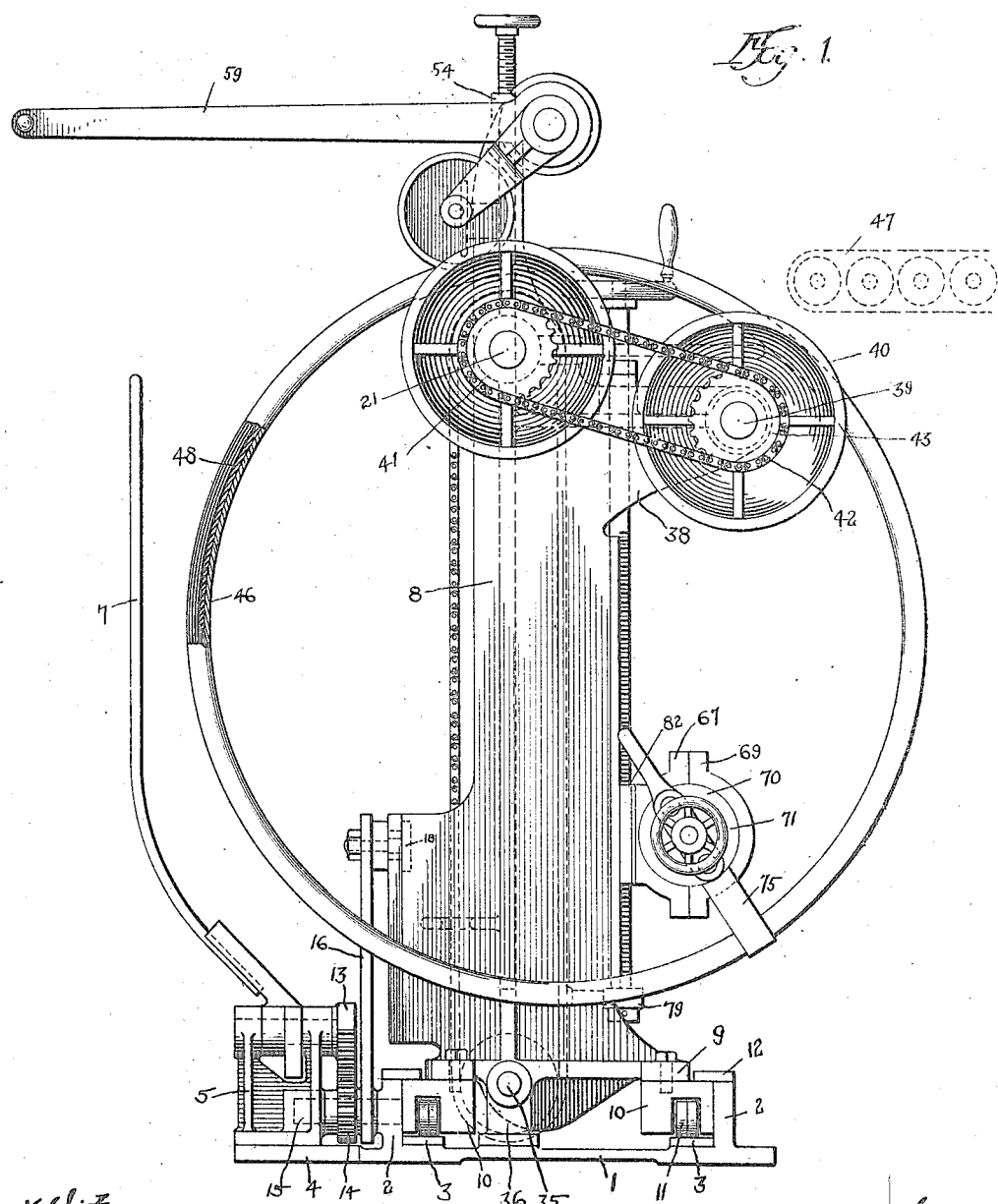
Figure 1 is a side elevation of the machine forming the subject matter of this invention showing a rim in position to receive the hard base.
Figure 2:
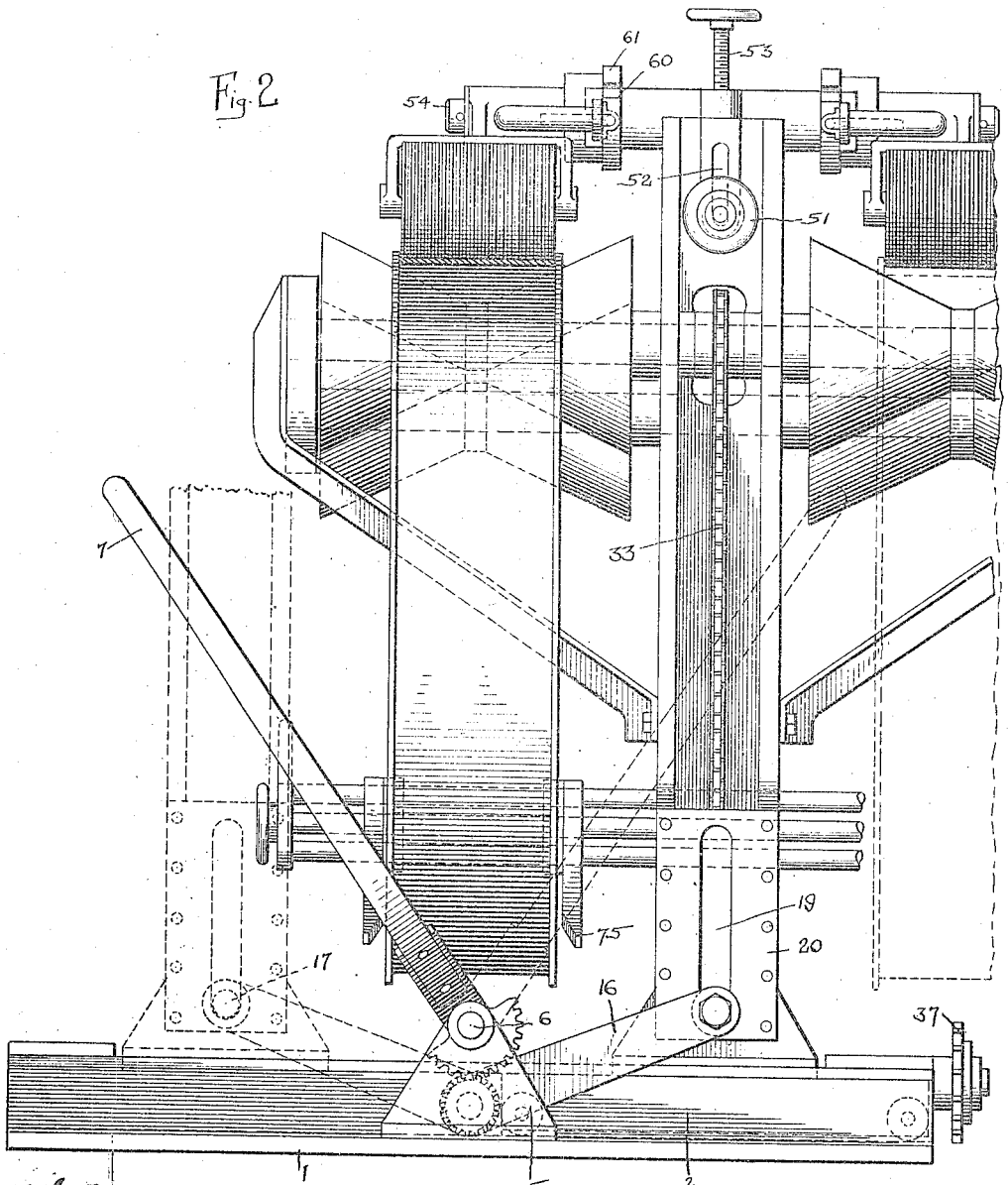
Fig. 2 is a side elevation looking from the left of Fig. 1.

Before entering into the details and description of my invention, it will be understood that the machine herein shown is duplicate in character, that is, it is capable of supporting two rims at the same time in order that while one rim is being taken off and another put in its place, a third rim may be operated upon by the machine. Furthermore, it will be understood that the machine is so constructed as to enable rims of all sizes to be covered by the hard base.

The machine is carried on a flat cast iron base plate indicated at 1. This plate is provided with two spaced longitudinally extending parallel ribs or rails 2. On the upper surface of the plate next to the rails are secured steel track-ways 3 upon which the machine is adapted to operate as will be described. At the front of the machine the base plate is provided with an extension 4 to which is secured a bracket 5 in the upper end of which is rotatably mounted an operating shaft 6, to which is secured an upwardly extending hand lever 7.

The machine comprises a vertical column or post 8, which is supported on a base 9 to the under side of which are secured bearing members 10 in which are mounted rollers 11 adapted to rest on the track-ways 3. The bearing pieces 10 are so spaced as to accurately fit between the rails 2 and yet allow the column 8 to be moved backwardly and forwardly on the track-ways. Plates 12 are secured to the upper surfaces of the rails 2 and project over the bearings 10, serving to hold them on the track-way.

The shaft 6 above referred to carries at its inner end a gear segment 13 which meshes with a pinion 14 mounted on a stub-shaft 15 held in the lower part of the bracket 5 and the adjacent rail 2. To the shaft 15 is keyed a lever 16 the upper end of which carries a roller 17 held on a flange pin 18 in a slot 19 formed in a plate 20 secured to the lower front side of the column 8. It will be noted by actuation of the lever 7 the operator can move the supporting column 8 to either end of the base plate 1 over the tracks 3.

Near the upper end of the column 8 is journaled a horizontal shaft 21 extending on either side of the column. On each side of the column there is rotatably mounted on the shaft a double conical rim supporting roller 22. The rim supporting rollers are formed with facing clutch surfaces 23. At about the midway point of the shaft 21 and in the center of the column 8 there is mounted a sprocket wheel 24 which is secured to a hub 25 keyed to the shaft 21. On either side of the hub 25 is loosely mounted a sleeve 26 carrying lugs 27 in which is pivoted an operating handle 28. This operating handle carries slotted spanner arms 29 which project on either side of the shaft 21 and receive pins 30 on a clutch collar 31. This clutch collar has mounted in its outer face for rotary movement a clutch member 32 keyed to the shaft 21. It will be seen that upon drawing the hand lever 28 away from the center line of the machine, either one or both of the rim supporting rolls may be rotated. The sprocket 24 is driven by a sprocket chain 33, which passes over a second sprocket wheel 34 keyed to a longitudinal shaft 35, carried in bearings 36 located at the ends of the base plate 1. This shaft is driven by a sprocket wheel 37 from any suitable source of power. As the sprocket wheel 34 is splined to the shaft 35 it is possible to move the carriage formed by the column 8 and bearings 9, and rollers 11 to either end of the base plate 1, and thus present either pair of rim carrying rollers to the operator, and to the conveyer on which the hard bases are supplied, as will be described.

Figure 3:
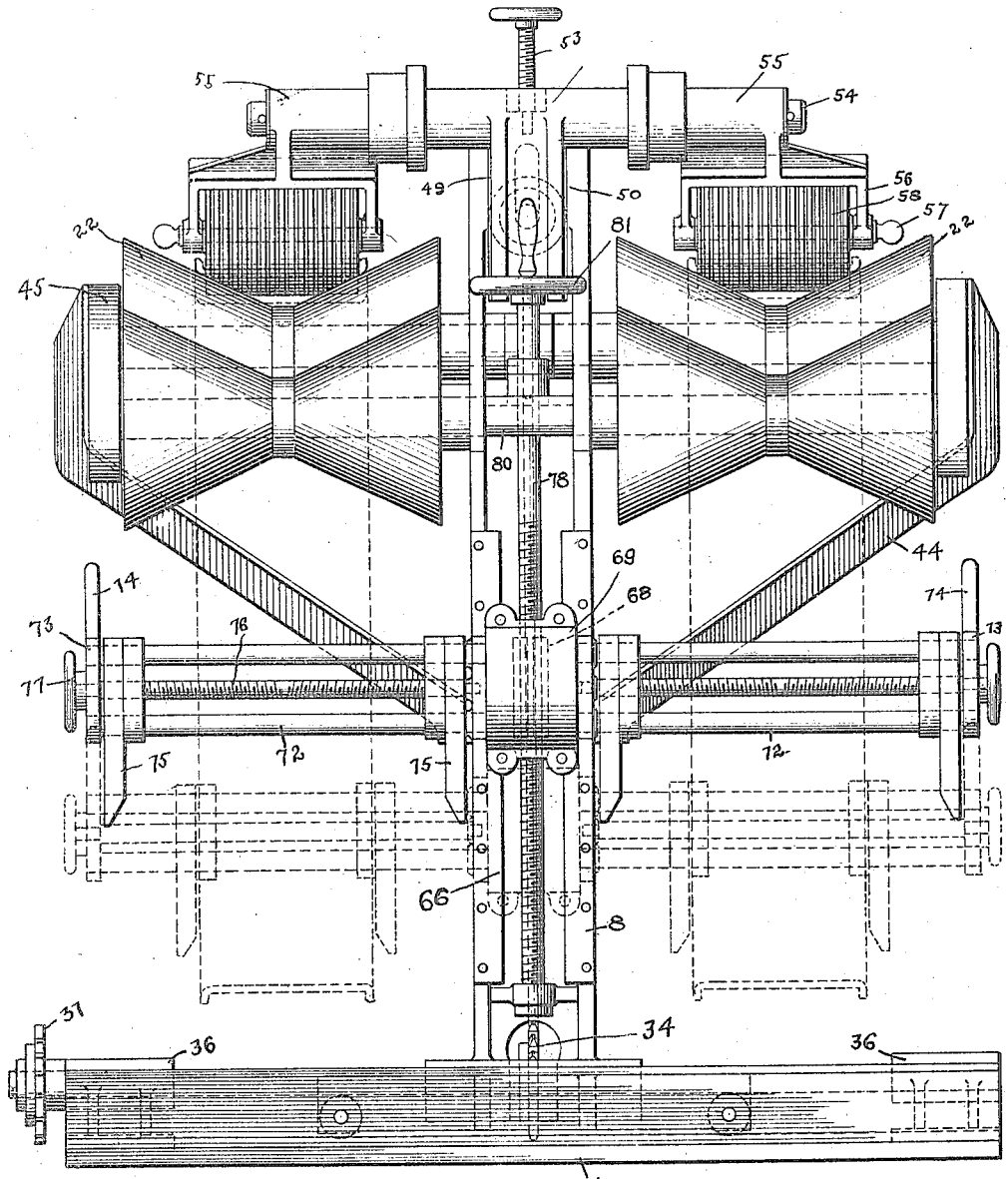
Fig. 3 is a side elevation looking from the right of Fig. 1.

On the upper part of the column 8 there are formed rearwardly extending brackets 38 in the outer ends of which is mounted a horizontal shaft 39 which carries secondary rim supporting rollers 40. These rollers are arranged to be driven from sprocket wheels 41 secured on the outer ends of the primary rim supporting rollers. Sprocket chains 42 pass over the sprocket wheels 41 and over sprocket wheels 43 secured on the secondary rim supporting rollers. Brackets 44 may be secured to the column 8 at either side and are arranged to carry chain guards 45, as shown in Fig. 3.

The rim 46 is placed over the rollers 22 and 40 on one side of the machine. The hand lever 7 is now operated to bring the carriage in line with the conveyer 47 which brings a strip of hard rubber compound from the extruding machine and on which conveyer the strip may be cut to the exact length required to go around the rim. A portion of the rim in Fig. 1 is broken away and shows the hard base 48 applied thereon. In order to press the hard base into intimate contact with the rim, there are provided pressure rollers adapted to be positioned over the rim. These rollers are carried by a slide plate 49 mounted for vertical adjustment in a guideway 50 formed on the rear side of the columns. A hand wheel 51 operating in a slot 52 on the column is provided for the purpose of securing the slide in its vertical adjustment. A screw 53 passing through a lug 54 on the front of the slide 49 bears against the upper end of the column 8 and furnishes a means for moving the slide vertically. The slide 49 carries a horizontal shaft 54 which extends over the rim supporting rollers. On the outer ends of the shaft 54 are mounted sleeves 55 each of which carries a stitcher roll supporting yoke 56 in the outer end of which is carried a pin 57 on which is mounted the stitcher 58. This stitcher is in the form of a roller and is slightly corrugated in order to force the rubber more intimately into contact with the grooves which are usually formed in the rim. The stitcher rollers may be changed when different sized rims are operated upon to enable a certain range of adjustability, but if further adjustability is desired a second set of different sized yokes with different sized stitching rollers may be provided in place of those shown. The sleeve 55 is formed with a handle 59 on which the operator may press, forcing the roller 58 down upon a hard base as it is applied to the rim. A notch 60 is formed on a collar 61 located on the slides 49, the notch being adapted to be engaged by a slidable detent 62 mounted in a boxing 63 on the inner end of the handle 59. This detent serves to hold the stitching roller 58 upwardly out of contact with the rim as shown in dotted lines in Fig. 5. A pull bar 64 is mounted along the handle 59 being urged inwardly by a spring 65, the operator moving the pull bar outwardly when desiring to manipulate the stitching roller 58.

On the front face of the supporting column 8 there is formed a vertical guideway 66 on which is slidably mounted a carriage 67. This carriage 67 is hollowed out to form a semi-circular recess 68 which is covered by a plate 69 having a semi-circular recess similarly formed. Rotatably mounted at each side of the casing formed by the parts 67 and 69 is a supporting spool 70 formed with enlarged portions inwardly and outwardly of the casing, it being held in place by a cap 69. The outwardly extending portion 71 of the supporting spool at each side of the casing carries two parallel rods 72 which are united at their outer ends by arms 73 provided with handles 74. Slidably mounted on each pair of rods 72 are a pair of guiding fingers 75 having screw threaded engagement with a centrally located reversely screw-threaded shaft 76 operable by a hand wheel 77. The whole carriage formed by the parts 67 and 69 and the outwardly extending rod is movable vertically in the guideway 66 by a vertical screw 78 mounted in a step bearing 79 at the lower part of the column and extending through a bearing 80 in the upper end thereof. A hand wheel 81 furnishes means for rotating the shaft which communicates vertical movement to a boxing 82 at the back of the slide 67.

It will be seen that by operation of the hand wheel 81 the guiding fingers 75 may be moved vertically to accommodate rims of different diameters as they are hung on the supporting rollers, while by manipulation of the hand wheel 77 the fingers may be moved to contact the sides of the rims of different widths. The handle 74 may be used to rock the guide finger supports about in the casing 67 and 69 so that the guide fingers may be removed from the side of the rim when it is desired to take the same from the machine.

It is believed that the operation of the machine will have been understood as the description proceeded.

It is obvious that changes may be made in the invention without departing from the spirit of the same or sacrificing any of its benefits.

I claim:

1. In a machine for applying a layer of rubber to a rim, the combination of a delivery conveyer, a carriage, two sets of rim supporting and rotating means on said carriage, and means for moving said carriage transversely of said conveyer whereby either set of rim supporting means may be presented to it.

2. In a machine for applying a layer of rubber to a rim, the combination of means for delivering the layer of rubber, a carriage, two sets of rim supporting and rotating means in said carriage, and means for moving said carriage transversely of said delivery means, whereby either set of rim supporting means may be presented to it.

3. In a machine for applying a layer of rubber to a rim, the combination of a support, a transverse shaft extending from said support, a rim supporting roller on said shaft, means for rotating the said roller whereby the rim is revolved, an arm pivoted on said support above the rim, a compacting roller on said arm and means for forcing the compacting roller against the rim.

4. In a machine for applying a layer of rubber to a rim, the combination of a support, a transverse shaft extending from said support, a rim supporting roller on said shaft, a second transverse shaft, a secondary rim supporting roller on said last named shaft, means for rotating one of said rollers whereby the rim is revolved, an arm pivoted on said support above the rim, a compacting roller on said arm and means for forcing the compacting roller against the rim.

5. In a machine for applying a layer of rubber to a rim, the combination of two double coned rollers for supporting the rim, means for rotating one of said rollers to revolve the rim, a compacting roller above the supporting rollers, and means for forcing said compacting roller against said rim.

6. In a machine for applying a layer of rubber to a rim, the combination of two double coned rollers for supporting the rim, means for rotating one of said rollers to revolve the rim, an arm pivotally mounted above the rim, a compacting roller on said arm and means for forcing the compacting roller against the rim.

7. In a machine for applying a layer of rubber to a rim, the combination of a support, a roller on said support, on which the rim may be suspended means for rotating said roller to revolve the rim, a compacting roller above the rim adapted to force the rubber on to the rim, means for pressing said roller against the rim, guiding fingers at the sides of the rim, means for raising and lowering said fingers to accommodate rims of different diameters and means for adjusting said fingers to accommodate rims of different widths.

8. In a machine for applying a layer of rubber to a rim, the combination of a support, a roller on said support, on which the rim may be suspended means for rotating said roller to revolve the rim, a compacting roller above the rim adapted to force the rubber on to the rim, means for pressing said roller against the rim, guiding fingers at the sides of the rim, means for raising and lowering said fingers to accommodate rims of different diameters, means for adjusting said fingers to accommodate rims of different widths, and means for moving said fingers from the sides of the rim.

9. In a machine for applying a layer of rubber to a rim, the combination of a support, a roller on said support on which the rim may be suspended, means for rotating said roller to revolve the rim, a compacting roller above the rim adapted to force the rubber on to the rim, means for pressing said roller against the rim, a guiding finger at the side of the rim and means for moving the finger from the side of the rim.

WILLIAM C. STEVENS.